US007006435B1

(12) United States Patent
Davies et al.

(10) Patent No.: US 7,006,435 B1
(45) Date of Patent: Feb. 28, 2006

(54) ROUTING DEVICE

(75) Inventors: Neil James Davies, Bristol (GB); Judith Yvonne Holyer, Bristol (GB); Peter William Thompson, Bristol (GB); Jeremy Thomas Bradley, London (GB); Pauline Patricia Francis-Cobley, St. James (GB)

(73) Assignee: U4EA Technologies Limited, Bristol (GB)

( * ) Notice: Subject to any disclaimer, the term of this patent is extended or adjusted under 35 U.S.C. 154(b) by 0 days.

(21) Appl. No.: 09/959,298

(22) PCT Filed: Apr. 20, 2000

(86) PCT No.: PCT/GB00/01569

§ 371 (c)(1),
(2), (4) Date: Jan. 10, 2002

(87) PCT Pub. No.: WO00/65783

PCT Pub. Date: Nov. 2, 2000

(30) Foreign Application Priority Data

Apr. 23, 1999 (GB) .................................... 9909436

(51) Int. Cl.
*H04L 12/26* (2006.01)

(52) U.S. Cl. ..................................... 370/230; 370/230
(58) Field of Classification Search ................ 370/230, 370/230.1, 231, 235, 236, 339, 392, 395.2, 370/395.21, 395.42, 400, 401, 412, 428, 370/429

See application file for complete search history.

(56) References Cited

U.S. PATENT DOCUMENTS

| 5,408,465 | A |   | 4/1995  | Gusella et al. |
| 5,793,976 | A | * | 8/1998  | Chen et al. ................. 370/252 |
| 5,850,385 | A | * | 12/1998 | Esaki ..................... 370/395.21 |
| 5,862,126 | A |   | 1/1999  | Shah et al. |
| 5,864,540 | A |   | 1/1999  | Bonomi et al. |
| 5,982,748 | A | * | 11/1999 | Yin et al. ................... 370/232 |
| 6,404,738 | B1 | * | 6/2002 | Reininger et al. .......... 370/236 |

FOREIGN PATENT DOCUMENTS

| EP | 0 828 403 A1 | 3/1998 |
| EP | 0 901 302 A2 | 3/1998 |
| EP | 0 901 302 A3 | 3/1999 |

* cited by examiner

*Primary Examiner*—Chi Pham
*Assistant Examiner*—Anh-Vu Ly
(74) *Attorney, Agent, or Firm*—Rothwell, Figg, Ernst & Manbeck

(57) ABSTRACT

A routing device for routing streams at a node in a packet transmission network receives a stream request, reads specified parameters and any values for loss and delay already incurred at preceding nodes in the network, or specified parameters as modified to take account of loss and delay already incurred at preceding nodes in the network, to determine in conjunction with existing streams already being handled by the routing device whether to accept or reject the stream, allocates one or more buffers to the stream if the stream request has been accepted, transmits the stream request with modified values for loss and delay, or with modified parameters to take account of loss and delay incurred at this and preceding nodes in the network if the stream request has been accepted, and returns a fail signal if the stream request has been rejected.

19 Claims, 9 Drawing Sheets

PACKET SWITCH WITH DECIDER

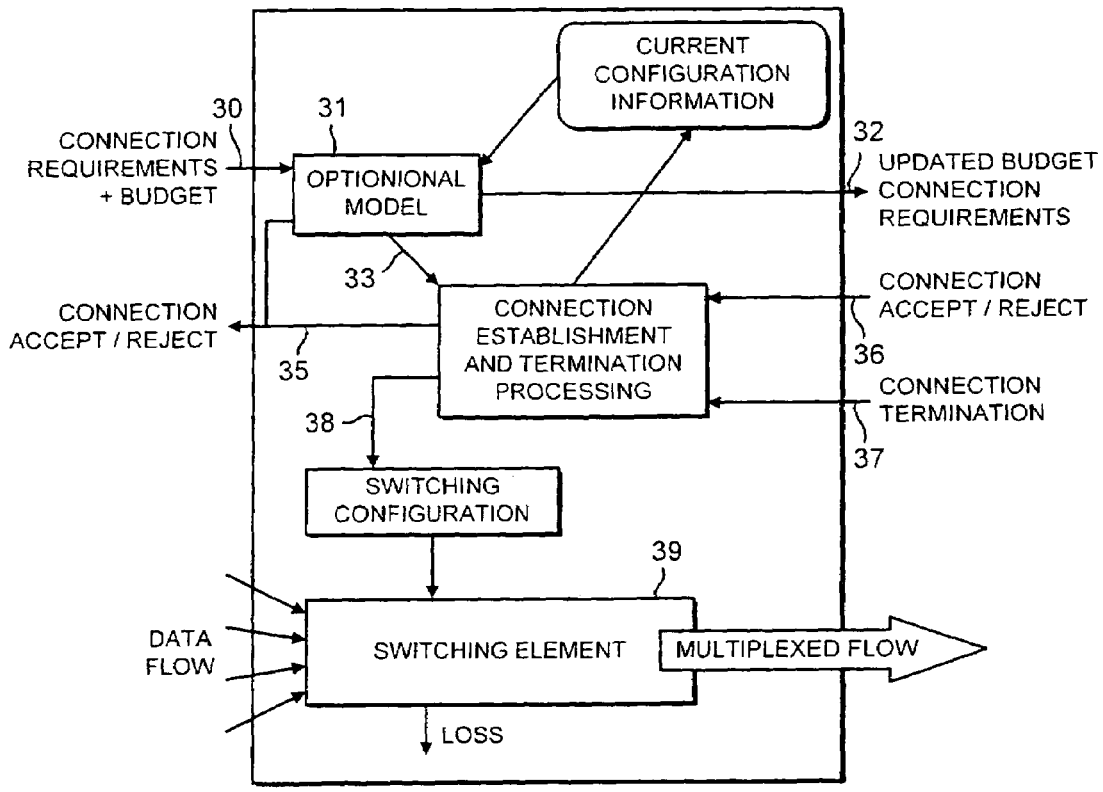

FIG. 3

⟨0⟩ ⇌ ⟨1⟩ ⇌ ⟨2⟩ ⇌ ...... ⇌ ⟨$K_b$⟩ ⇌ ⟨$K_b$+ 1⟩ ⇌ ...... ⇌ ⟨$K_{max}$ - 1⟩ ⇌ ⟨$K_{max}$⟩

→ REPRESENTS POISSON ARRIVALS OF BOTH CHERISHED AND
UNCHERISHED TRAFFIC AT A RATE $\lambda_p + \lambda_b$
→ REPRESENTS POISSON ARRIVALS OF CHERISHED TRAFFIC AT RATE $\lambda_p$
ALL LEFT POINTING ARROWS REPRESENT PACKETS SERVICED AT THE POISSON RATE $\mu$.
UNCHERISHED TRAFFIC IS ONLY ADMITTED TO THE FIRST $K_b$ BUFFERS.
CHERISHED TRAFFIC MAY BE ADMITTED TO ANY OF THE $K_{max}$ BUFFERS.

FIG. 4

DELAY Vs. TOTAL DEMAND FOR URGENT TRAFFIC WITH $\Lambda p / \mu = 0.7$

DELAY Vs. TOTAL DEMAND FOR NON URGENT TRAFFIC WITH $\Lambda p / \mu = 0.7$

DELAY JITTER Vs. TOTAL DEMAND FOR URGENT TRAFFIC WITH $\Lambda p / \mu = 0.7$

DELAY JITTER Vs. TOTAL DEMAND FOR NON-URGENT TRAFFIC WITH $\Lambda p / \mu = 0.7$

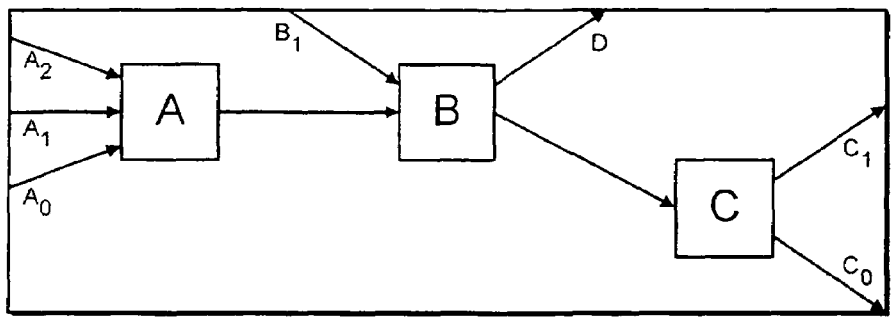

INITIAL SETTINGS OF THE SAMPLE NETWORK

| SWITCH | TRAFFIC STREAM | ACTUAL THROUGH-PUT | ALLOCATED CLASS | BUFFER CONFIGURATION CHERISHED / TOTAL | BUDGET / ACTUAL CELL LOSS RATIO | BUDGET/ACTUAL DELAY (CELL TRANSMISSION TIMES) |
|---|---|---|---|---|---|---|
| A | $A_1 =>D$ | 0.5 | $C, \neg U$ | 20 / 50 | $5 \times 10^{-6}$ / $5.5 \times 10^{-8}$ | 40 / 20.5 |
|  | $A_2 =>D$ | 0.25 | $\neg C, \neg U$ |  | 11.5% | - / 19.0 |
|  | $A_2 =>C_1$ | 0.3 | $\neg C, \neg U$ |  | 11.5% | - / 19.0 |
| B | $A_1 =>D$ | 0.5 | $C, \neg U$ | 15 / 30 | $5 \times 10^{-6}$ / $4.4 \times 10^{-6}$ | 20 / 12.75 |
|  | $A_2 =>D$ | 0.2212 | $\neg C, \neg U$ |  | 28.8% | - / 12.56 |
|  | $A_2 =>C_1$ | 0.2655 | $\neg C, \neg U$ |  | 28.8% | - / 12.56 |
|  | $B_1 =>D$ | 0.1 | $\neg C, \neg U$ |  | 28.8% | - / 12.56 |
|  | $B_1 =>C_1$ | 0.1 | $\neg C, U$ |  | 28.8% | - / 1.07 |
| C | $A_2 =>C_1$ | 0.213 | $\neg C, \neg U$ |  |  |  |
|  | $B_1 =>C_1$ | 0.08 | $\neg C, U$ |  |  |  |

FIG. 17

SETTINGS OF THE NETWORK SWITCH AFTER ACCEPTING CALL

| SWITCH | TRAFFIC STREAM | ACTUAL THROUGH-PUT | ALLOCATED CLASS | BUFFER CONFIGURATION CHERISHED / TOTAL | BUDGET / ACTUAL CELL LOSS RATIO | BUDGET/ACTUAL DELAY (CELL TRANSMISSION TIMES) |
|---|---|---|---|---|---|---|
| A | $A_0 => C_0$ | 0.2 | C, U | 30 / 50 | $10^{-5}$ / $0.6 \times 10^{-6}$ | 5 / 1.25 |
|   | $A_1 => D$ | 0.5 | C, ¬U |   | $5 \times 10^{-6}$ / $1.5 \times 10^{-6}$ | 50 / 24.35 |
|   | $A_2 => D$ | 0.25 | ¬C, ¬U |   | 45.74% | - / 20.29 |
|   | $A_2 => C_1$ | 0.3 | ¬C, ¬U |   | 45.74% | - / 20.29 |
| B | $A_0 => C_0$ | 0.2 | C, U | 30 / 60 | $10^{-5}$ / $0.5 \times 10^{-6}$ | 5 / 1.3 |
|   | $A_1 => D$ | 0.5 | C, ¬U |   | $5 \times 10^{-6}$ / $1.3 \times 10^{-6}$ | 50 / 37.80 |
|   | $A_2 => D$ | 0.13565 | ¬C, ¬U |   | 39.9% | - / 33.98 |
|   | $A_2 => C_1$ | 0.16278 | ¬C, ¬U |   | 39.9% | - / 33.98 |
|   | $B_1 => D$ | 0.1 | ¬C, ¬U |   | 39.9% | - / 33.98 |
|   | $B_1 => C_1$ | 0.1 | ¬C, U |   | 39.9% | - / 1.3 |
| C | $A_0 => C_0$ | 0.2 | C, U |   |   |   |
|   | $A_2 => C_1$ | 0.0978 | ¬C, ¬U |   |   |   |
|   | $B_1 => C_1$ | 0.0601 | ¬C, U |   |   |   |

ROUTING DEVICE

BACKGROUND OF THE INVENTION

1. Field of the Invention

The present invention relates to routing devices for data transmission networks, and especially to routing devices having a capability to make decisions.

2. Description of the Related Art

Communication networks in which data is transferred from a source to a destination in packets, each packet being sent in a series of steps from one component in the network to the next until it reaches its destination, are well known. Some such networks attempt to deliver guarantees of bandwidth and specific limits on the delay that packets experience and the proportion of them that must be discarded during periods of congestion.

One problem in such networks is to be able to constrain the quantity of data admitted into the network in order to provide a good level of overall service. One solution to this problem is to allow a source to introduce a series of packets of data into the network only after a request to do so has been accepted by the network (in a step referred to as a "call acceptance"). In current networks, the decision whether or not to accept such a request is either made without considering the ability of the network to provide actual end-to-end requirements of the request or involves a centralised process that keeps track of the current set of requests accepted by the network as a whole. In the first case no guarantees of service can be offered by the network, only promises to treat some packets relatively better than others; while in the second case the centralised process limits the call-acceptance performance of the network. In any event, in current networks guarantees of service can only be given on the condition of substantial under-utilisation of the network resources, to provide capacity for use by guaranteed quality services.

When a switch in a network is running at or close to its full capacity, performance deteriorates for all traffic (i.e. the flow of packets of data as previously mentioned), unless some of the traffic is treated preferentially. Traditionally, congestion control mechanisms are introduced to manage traffic at the point when a queue at a switch starts to become full. Adding more buffers can apparently control loss. There is a penalty for this because the additional buffers introduce further delays and can lead to retransmission of traffic, and this then increases the congestion even more.

It is currently commonly understood in the academic literature as exemplified by Kleinrock, L. "Queuing Systems Volume 11: Computer Applications", Wiley, New York, 1976 or Stallings, W, "High-Speed Networks: TCP/IP and ATM Design Principles", Prentice Hall, N.J., 1998 (both of which are hereby incorporated by reference) that as the demand at any switch approaches unity then the average queue size and delay grow without bound and this is true however switches are managed and whatever their configuration. Traditionally, congestion control mechanisms as described in Jain, R., "Congestion Control and Traffic Management in ATM Networks: Recent Advances and A Survey", Computer Networks and ISDN Systems, vol. 28, no 13, November 1996, pp1723–1738, are introduced to manage traffic at the point when the queue at a switch starts to become full. Adding more buffers can apparently control loss. There is a penalty for this because the additional buffers introduce further delays and can lead to retransmission of traffic, and this then increases the congestion even more.

There is a need to address these problems so as to be able to route transmissions with the possibility of improved service quality.

The use of priority or weighted fair queuing is known, as is the use of selective discard to limit queue length, as described for instance in McDysan, D. and Spohn, D. "ATM Theory and Application", McGraw-Hill, New York 1998 pp 630–632. However there is no simple method currently described for deciding whether to admit a call considering both its loss and delay requirements exploiting the flexibility offered by the combination of these techniques.

WO 98/28939 describes a deterministic technique by which traffic is dynamically classified at a node and delivered downstream. Transfers can be aborted due to delay tolerance being exceeded. By this means, a certain number of flows are guaranteed a minimum bandwidth. However, only performance at a single node is addressed, not end-to-end performance. Furthermore, traffic is put into classes by the system, not on the basis of a user's decision.

U.S. Pat. No. 5,408,465 describes a system that offers soft deterministic guarantees that the end-to-end QoS (quality of service) is respected most of the time, and uses "pseudo-traffic" to decide whether to admit real traffic U.S. Pat. No. 5,357,507 describes a system in which cell loss is the primary QoS parameter, relying on second derivatives of the input traffic stream characteristics. The system has 0 buffers. WO 95/17061 describes a system in which cell loss is the primary QoS parameter, and which uses large-deviation theory. EP 0 673 138 A describes a deterministic system in which cell loss is the primary QoS parameter. EP 0 814 632 A describes a system in which cell loss is the primary QoS parameter, and which assumes strict priority queuing. U.S. Ser. No. 08/723,649 and equivalents describe a system in which cell loss or delay is the QoS parameter. None of these systems considers both loss and delay in their QoS decision-making.

EP 0 828 362 A describes a system that uses a central network controller for CAC (call admission control), and does not provide guarantees for the duration of a connection.

SUMMARY OF THE INVENTION

According to one aspect of the present invention there is provided a routing device for routing calls at a node in a packet transmission network, wherein each call is transmitted with specified parameters for its loss and delay in the network, the routing device comprising:

call admission control circuitry for receiving a call request and for reading:
  (i) said specified parameters and any values for loss and delay already incurred at preceding nodes in the network, or
  (ii) said specified parameters as modified to take account of loss and delay already incurred at preceding nodes in the network, to determine in conjunction with existing calls already being handled by the routing device whether or not to accept or reject the call;

buffer circuitry including a plurality of buffers, wherein one or more of said buffers are allotted to said call if the call request has been accepted; and means for transmitting:
  (i) the call request with modified values for loss and delay, or
  (ii) the call request with modified parameters to take account of loss and delay incurred at this and preceding nodes in the network, if the call request has been accepted, and for returning a fail signal if the call request has been rejected.

Preferably the routing device includes means for detecting a call fail signal from another node in the network and for releasing the buffers which it had allocated for that call.

According to a second aspect of the present invention there is provided a node device for operation at a node in a data transmission network wherein two or more calls having specified quality of service requirements may be routed through the node, the node comprising:
- an input for receiving data;
- an output for transmitting data;
- a data flow unit for directing data received by the input to the output for transmission; and
- a data flow controller for controlling the operation of the data flow unit to delay and/or fail to direct a portion of the data in order to meet the specified quality of service.

Preferably the quality of service is specified by less than three of maximum loss rate, minimum delay and minimum throughput. Preferably the data flow controller is capable of modelling the operation of the node and/or any associated data links to estimate an unspecified one of loss rate, delay and throughput. Preferably the data flow controller is capable of modelling the effect of an additional call having a specified quality of service. That modelling may be used to decide whether to accept or reject the call, for example by the node determining whether the effect would be to fail to meet the specified quality of service. Preferably the data flow controller is capable of modelling the effect of an additional call and of generating a message indicating one or more parameters indicating the quality of service available for that call.

Preferably the data flow unit comprises means for distinguishing at least two categories of traffic. Preferably it also comprises a buffer for holding packets prior to retransmission. Preferably it also comprises a means for discarding packets belonging to one category when the number of packets in the buffer exceeds a threshold. Preferably it is responsive to vary the value of the threshold. Preferably it also comprises a means to further distinguish at least two classes of traffic each of which may contain traffic from either of the aforementioned categories. Preferably it also comprises a means to schedule the retransmission of packets held in the buffer so that packets assigned to the first class are preferred over those assigned to the second class. Preferably it is responsive to vary the assignment of received packets to the categories and the classes.

Preferably the data flow controller is able to set the threshold of the data flow unit. Preferably it is also able to vary the assignment of received packets to the categories and the classes.

According to a third aspect of the present invention there is provided a routing device for routing calls at a node in a packet transmission network, wherein each call is transmitted with specified parameters for its acceptable delay and probability of loss during transmission in the network, the routing device comprising:
- call admission control circuitry for:
  - (i) receiving a call request comprising parameters for quality of service,
  - (ii) modelling the quality of service for the call if it were routed through this node,
  - (iii) generating adjusted parameters for quality of service by adjusting the received parameters for quality of service to take account of reduction in quality of service if the call were routed through this node,
  - (iv) if the adjusted parameters are indicative of unacceptable quality of service rejecting the call, and
  - (v) if the adjusted parameters are indicative of acceptable quality of service transmitting the adjusted parameters to another node in the network.

The said parameters for quality of service preferably include at least two of: minimum delay, maximum loss rate and minimum throughput, and/or levels of variation of delay, loss rate or throughput, and extremes of likely values.

According to a fourth aspect of the present invention there is provided a node device for operation at a node in a data transmission network wherein two or more calls having specified quality of service requirements may be routed through the node, the node comprising:
- an input for receiving data;
- an output for transmitting data; and
- a data flow unit for directing data received by the input to the output for transmission; wherein said node is responsive to
- a data flow controller for controlling the operation of the data flow unit to delay and/or fail to direct a portion of the data in order to meet the specified quality of service.

According to a fifth aspect of the present invention there is provided in a network having one or more nodes for traffic having a variety of requirements, a means whereby a network node having finite resources to allocate (in particular the capacity of network links which it drives and its internal capacity to hold packets of data for later transmission) may decide whether it is capable of agreeing to a request (whether implicit or explicit) to support a stream, or collection of streams, of data through it having certain characteristics of data loss and delay, given that a number of other streams or collection of streams are already supported, without engaging in any interactions with other network nodes or keeping information about streams supported by other nodes in the network, in such a way that the overall end-to-end requirements of the stream can be satisfied, this means consisting of:

1. Maintaining within the node information on each stream of data passing through it, in particular the accumulated loss and delay of that stream between its source and the appropriate output link of the node, including the loss and delay imposed by the node itself the network link bandwidth and internal buffer capacity allocated;
2. Identifying an incoming message as a request to support a new stream of data;
3. Determining from the incoming request the requested maximum loss and delay and the loss and delay accumulated so far;
4. Applying a parameter to determine what proportion of the difference between the requested maximum loss and delay and the loss and delay accumulated so far can be added by this node so as to arrive at a quantity of loss and delay which can be added;
5. Performing a calculation, either by application of the described algorithm or by reference to a pre-computed look-up in a table, to establish the additional capacities needed to support the additional loss and delay to be imposed on the stream;
6. Checking whether these additional capacities are available; and
7. If they are:
   a. updating the message requesting the stream to be established so that the accumulated loss and delay are increased by the loss and delay imposed by the multiplexing of streams onto the network link by the node and sending it on the next stage of its route;

b. adding the information regarding this stream to that already held regarding other streams; and
c. computing the optimal allocation of the complete set of streams to the available resources; and
8. If they are not, returning the message requesting the stream to its source with an indication that the request is rejected.

The requested maximum loss and delay and the loss and delay accumulated so far of the request may suitably be extracted from the request message. The parameter to determine what proportion of the difference between the requested maximum loss and delay and the loss and delay accumulated so far can be added by this node so as to arrive at a quantity of loss and delay which can be added may suitably be pre-programmed. The parameter to determine what proportion of the difference between the requested maximum loss and delay and the loss and delay accumulated so far can be added by this node so as to arrive at a quantity of loss and delay which can be added may suitably be computed from the route taken by the request message The computation of the optimal allocation of the complete set of streams to the available resources may suitably be performed before the request is sent on to the next node. The computation of the optimal allocation of the complete set of streams to the available resources may suitably be performed after the request is sent on to the next node. The contents of the look-up table may suitably be calculated by solving a certain system of equations representing the operational behaviour of the node. The call acceptance message suitably contains information of the surplus loss and delay budget of the end-to-end call, which the node reduces before it sends it on and increases its stored excess budget for use by a subsequent call It is preferred that in a system according to the present invention queue sizes may be controlled in order to maximise effective throughput and reduce delay. Packet losses may preferably be balanced against throughput and delay. The network can then preferably run at full or substantially full utilisation whatever the demand upon it, up to a limit imposed by the network's capacity.

It is preferred that steps are not taken to avoid packet loss at all costs. However, packet loss is preferably a QoS parameter, most preferably by the specification of a finite non-zero packet loss rate. When the system is running at close to full capacity it is preferred that some traffic will be expected to be lost. This loss may suitably be applied equally to all traffic streams, so that all traffic is equivalently degraded by the congestion. It is preferably possible for some traffic to be "cherished" (i.e. not lost) more, while other traffic (suitably traffic such as voice data that is more urgent and will be useful only if it arrives with a short delay) is not delayed more. This is because if traffic is arriving at its destination too late to be of use to an application then it is already effectively lost and it is inappropriate to congest a network with traffic that cannot be delivered on time. In general, it is most preferred that both delay and loss can be set and limited in order to retain reasonable system performance.

Preferably the system provides strong statistical guarantees of how much of the time a designated QoS is respected. The system may use an operational model and/or statistical methods. The QoS analysed by the system preferably specifies end-to-end QoS performance for a message.

Preferably means is provided whereby a network node that has finite resources to be allocated (especially the capacity of network links which it drives and its internal capacity to hold packets of data for later transmission) may decide whether it is capable of agreeing to a request to support a stream of data through it having certain characteristics of data loss and delay, given that a number of other streams are already supported, without engaging in any interactions with other network nodes or keeping information about streams supported by other nodes in the network, in such a way that the overall end-to-end requirements of the stream can be satisfied. To achieve this the following steps are preferably performed:

1. Maintaining within the node information on each stream of data passing through it, in particular the accumulated loss and delay of that stream between its source and the appropriate output link of the node, including the loss and delay imposed by the node itself the network link bandwidth and internal buffer capacity allocated;
2. Identifying an incoming message as a request to support a new stream of data;
3. Extracting from the incoming request the requested maximum loss and delay and the loss and delay accumulated so far;
4. Applying a pre-programmed parameter to determine what proportion of the difference between the requested maximum loss and delay and the loss and delay accumulated so far can be added by this node so as to arrive at a quantity of loss and delay which can be added;
5. Performing a look-up in a table (which may be calculated by solving a certain system of equations representing the operational behaviour of the node) to establish the additional capacities needed to support the additional loss and delay to be imposed on the stream;
6. Checking whether these additional capacities are available; and
7. If they are:
   a. updating the message requesting the stream to be established so that the accumulated loss and delay are increased by the loss and delay imposed by the multiplexing of streams onto the network link by the node and sending it on the next stage of its route;
   b. adding the information regarding this stream to that already held regarding other streams; and
   c. computing the optimal allocation of the complete set of streams to the available resources; or
8. If they are not, returning the message requesting the stream to its source with an indication that the request is rejected.

BRIEF DESCRIPTION OF THE SEVERAL VIEWS OF THE DRAWINGS

The present invention will now be described by way of example, with reference to the accompanying drawings, in which:

FIG. 3 illustrates a process for dealing with a request to establish a new connection.

FIG. 4 shows the state-transition diagram for a simple operational model with two levels of cell-loss priority (cherishing).

FIG. 15 illustrates routes for traffic.

FIGS. 16 and 17 illustrate initial and subsequent status of network switches.

DETAILED DESCRIPTION OF THE PREFERRED EMBODIMENTS

Figure 1:
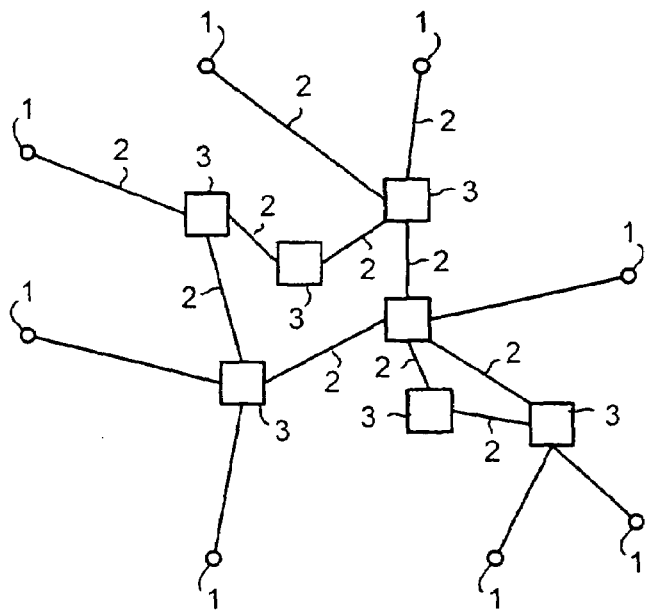
FIG. 1 is a schematic diagram of a data communication network.

Admitting a call or generally a data stream into a network requires confidence that the interaction between that call's traffic and existing traffic is benign. In making service level agreements this principle is given a monetary value. In this paper we describe the application of a probabilistic approach to call management. This model can be used to derive very conservative performance bounds where this is required, or to evaluate the dynamic probabilities of meeting particular service levels.

A large class of network applications, particularly real time applications such as telephony, can only operate satisfactorily when a network can reliably provide quality of service. This requires the ability for applications, directly or indirectly, to negotiate with the network to ensure that network delays do not impinge on the application's functionality.

The product of these negotiations are Service Level Agreements; they define the acceptable Quality of Service in terms which are both measurable and assurable; they constitute a contractual agreement between the network user and the network. In fact, they define the worst acceptable case for data transmission over the connection. In admitting a call there is an explicit recognition that the agreed level of service can be provided for the call's duration. Allocating resources on the basis of peak demand for each connection is one approach that guarantees this; however it does not allow for the exploitation of the statistical multiplexing of the traffic in the aggregation of the flow. In order to evaluate call admission, yet still exploit statistical multiplexing, there is a need to produce a model of how the individual streams of data will interact, and which predicts the likely service offered to individual cells and streams. If a switch is able, prior to call acceptance, to evaluate the typical cell delay, and probability of cell loss or of cells experiencing unacceptable delay, and manipulate its commitment of resources to ensure that these values fall within limits defined as acceptable by a SLA then it would be in a position to both ensure it meets its commitments, and to maximise the number of SLAs it can undertake.

These probabilities are defined fundamentally by the node's available buffering resources and the switch load.

It is generally a simple matter to provide guaranteed quality of service across a network with low utilisation; however, once the network approaches full loading the problem of resource allocation becomes harder. Since Service Level Agreements form a contractual obligation for the network, it is imperative that they are only undertaken when there are suitable resources available to meet them. Generally, the difficulties associated with managing an overloaded network are complicated by the lack of knowledge about the behaviour of the system in that state. The techniques described here exploit a new operational model having two degrees of freedom, which we can exploit by choosing to fix one parameter—preferably loss—and hence we are able to evaluate the consequences of different allocations on the total delay and throughput requirements for the calls through the switch. This model is theoretically unconditionally stable, even when under overload, and can be used to provide limiting values on Quality of Service parameters that are theoretically always valid.

This model is based largely on the consideration of packet loss and delay within a framework that corresponds closely to the actual operation of real network equipment. In such equipment packets are rarely lost due to transmission errors; the main source of loss is the lack of buffers to store the packet/cell for onward transmission. Our approach has to been to model the configuration of the system to sustain an agreed (and negotiated) level of loss for a particular stream. This loss can be predicted (within the knowledge of the traffic patterns) for the aggregated set of current calls. The same queuing process also determines the variation in delay, as well as its mean values. These observations allow for created a class of models of finite buffer systems. The most significant feature of these models is their description of the relationship between throughput, loss and delay (see diagram above) which allows a quantitative understanding of how to distribute switch resources amongst the active calls.

It is obvious that an overloaded node must discard cells. Since the node also has to meet its SLA commitments, however, it is required to discard cells intelligently. In these models two attributes of each cell stream may be considered: the desire to not discard the cell from a stream, which we name 'cherish', and the desire to minimise the transit delay of cells from a stream, which we name 'urgency'. Our model considers a cell stream to be classified by these two parameters. Considering two discrete levels of each of these parameters we arrive at the following distinct quality classes

|  | Cherished | Uncherished |
| --- | --- | --- |
| Urgent | <C,U> | <¬C,U> |
| Non-urgent | <C, ¬U> | <¬C, ¬U> |

Thus the switch can preferentially discard cells from streams whose SLAs allow a higher loss rate; this, combined with an intelligent CAC model, allows extremely tight bounds to be set on the loss rate for cherished traffic. Since this model scales to cover an indefinite number of urgency and loss-tolerance classes, it can provide all the subdivisions of cell disposability required to implement a number of arbitrary Service Level agreements simultaneously.

Although uncherished traffic may appear to suffer heavily as a result of this discard policy, it actually suffers a lower mean delay. For many of the applications most dependant on reliable Quality of Service provision (for example, video streaming) delay is a more important consideration than loss rates, since packets substantially delayed by a congested queuing system cannot be used on their eventual arrival. Similarly, at any given moment, the total delay experienced by cells passing through a given node can also be distributed to traffic streams of different urgency classes.

This operational model effectively maps cell streams into particular service classes defined by their urgency and cherish levels. Given a set of these mappings—for example, the set of calls that describes a large part of a switching node's state—and the throughput requested for each of those calls, it is possible to calculate the loss rate and delay mean and distribution both for each service class and the node as a whole. Of course, a connection's Quality of Service requirements are not specified on the level of individual nodes, but end to end. A crucial aspect of this model is it's composability; that is to say, the state of the switches along a path can be used to calculate similar key Quality of Service parameters, including the end to end mean loss rate and delay, and the delay's probability distribution function. This therefore provides the predictive model required to assess and optimise the resource commitment required to ensure a cell stream's Service Level Agreement is honoured; it allows probabilistic guarantees to be made regarding honouring the SLA.

Since any real switch has only a finite quantity of resources, it is obvious that not all requested calls can be accepted. A switch, therefore, must try to optimise the number of calls it can accept, whilst ensuring that it only rarely fails to meet calls' Quality of Service requirements.

This operational model has immediate applications for Connection Admittance Control (CAC) and QoS guarantees. Once a physical route for the connection has been found, it allows us to ensure incrementally that there are sufficient network resources along it to meet the connection's QoS requirements. This is done on a per switch basis, using only local knowledge (essentially, the switch's existing commitments in the form of SLAs and other QoS agreements on current connections); this allows a quick decision to be made on call acceptance without additional inter-switch control traffic. This bodes well for the scalability of the decision algorithm.

FIG. 1 shows a data communication network. Data can be communicated between any two of the connected terminal units 1 over data links 2 between switches 3. The switches 3 determine the route that the data is to follow. A message at a sending terminal can be divided into datagrams (packets) for transmission, which are then reassembled at the receiving terminal. The datagrams of a single message should follow the same route, constituting a call. The route taken by each message, and the status of the links and switches it encounters on its route, determine the delay between sending and receiving of packets of the message, and may cause some or all of the packets to be lost. If the packet contains data for a time-critical service such as voice telephony then the delay between the packet being sent and received must be small if there is to be an acceptable standard of service.

For a network connection with finite resources, delay, throughput and loss rate are interrelated. A detailed consideration of the relationship between these three factors can allow for improved balancing of resources to ensure that as many connections as are possible are accepted in a communication network. For example, under an improved regime it may be possible for a switch to meet otherwise unattainable delay requirements by allocating substantially more average bandwidth than was originally requested. The detail of the relationship between delay, throughput and loss rate is defined by the operational behaviour of the switching elements in the network, which may be a function of parameters that can be optimised.

Figure 2:
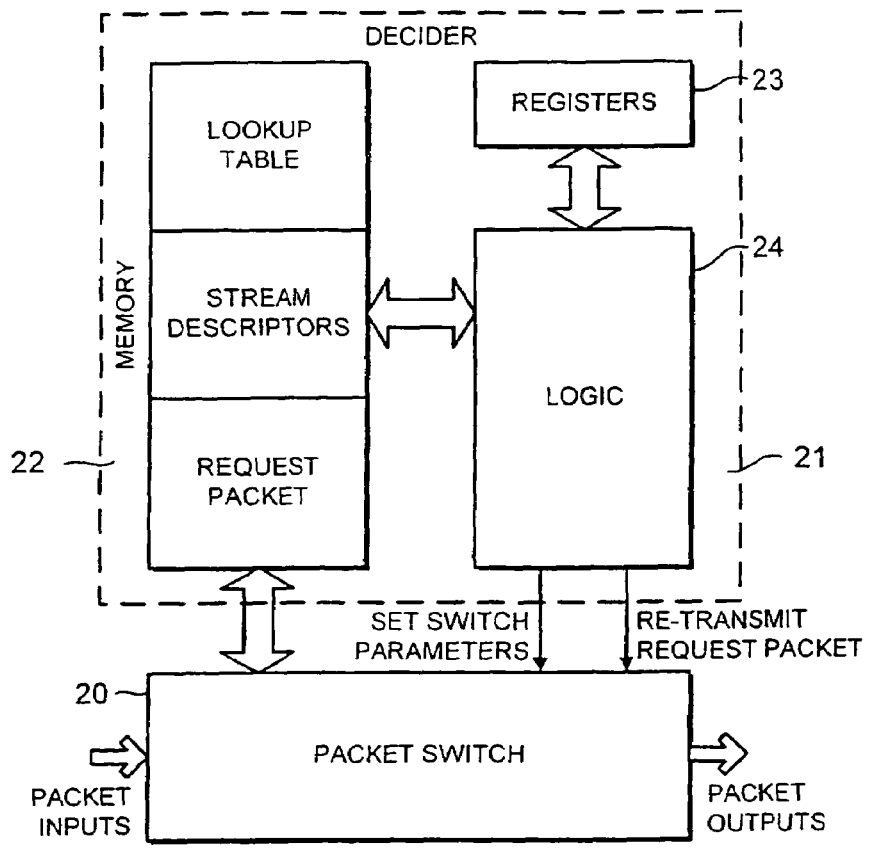
FIG. 2 shows a packet switch having a decider connected to its main part.

FIG. 2 shows the structure of an improved packet switch unit, which could act as one of the switches 3 of FIG. 1. The packet switch unit comprises a packet switch 20 to whose main part is connected a decider 21. The decider comprises a storage means 22, temporary registers 23 and logic 24 (for example a processor) which can act on the contents of the registers to perform comparisons and manipulations of selected bit-fields. The logic 24 is connected so that it can read and write values to the memory 22. The packet switch 20 is able to distinguish request packets from other packets and to write them in to the memory for operation upon by the decider. It can also read the (possibly modified) packet from the memory and transmit it. The decider has the ability to indicate to the switch when the packet is to be transmitted and also to set the parameters of the switch that determine the details of the switch behaviour.

FIG. 3 illustrates the functionality of a switch unit for dealing with a request to establish a new connection. Each switch along the connection route followed by a packet consumes a portion of the connection's acceptable delay and loss 'budget' and offers the remainder of that budget to switches further down the route. Using the functionality illustrated in FIG. 3 the delay and loss budget is analysed by switching elements along the route to determine the characteristics of the connection. The analysis of the budget consumption is done by means of the operational model of the switching element and the current configuration (encoded in the tables shown below). Instead of making a connection that results eventually in unacceptable loss or delay, using the functionality of FIG. 3 a connection can be rejected immediately if there is insufficient budget remaining for the connection to be established; otherwise the request is passed (with reduced budget) on to the next switching element. Eventually a message is returned from the destination. This will either be a call acceptance (in which case the actual switch configuration is updated to accommodate the new connection) or a rejection, from some element further along the route (in which case the resources allocated to this connection are released). In either case the message is passed back towards the originator of the request as indicated by the arrow to the left.

In more detail, the process of establishing a connection for data along a path between a start node and an end node across a plurality of links joined by switch units of the type shown in FIG. 2 is as follows. The start node, the system or a user of the start or end node establishes a budget of total acceptable delay and loss for the connection. This is transmitted to the first switch on the path (arrow 30 in FIG. 3). The switch applies its operational model (at 31) to determine it and its associated link's effect on a packet, modifies the budget information accordingly to indicate the amount of the budget available to succeeding switches and links of the path, and if there is budget remaining it transmits the updated budget information (at 32) to the next succeeding switch. The next succeeding switch performs the same operation. If the budget is exceeded then a message is sent (at 33) to means 34 for accepting or rejecting a connection, to cause the means 34 to reject the connection by sending a reject message (at 35) to the next preceding switch. The means 34 can also reject the connection in the same way if it receives a reject message (at 36) from the next succeeding switch. The means 34 can accept the connection if it receives an accept message (at 37) from the next succeeding switch. Accept messages are initiated by the end node receiving a message from the last succeeding switch indicating that the total available budget is not exceeded for the connection. If the connection is accepted then the means 34 transmits a configuration message at 38 to configure the switching element 39 of the switch to cause the data to follow the accepted route through the switch towards the next succeeding switch in the agreed path.

The operational model (illustrated at 31 in FIG. 3) for the switch and its use in call acceptance and control is of importance to define the relationship between the aggregate requirements of the set of streams destined for a particular outgoing link and the required resources associated with that link, and between requirements for loss and delay.

Consider the combination of a single output port from a switch, this can be viewed as a multiplexer combining the routed input streams from input ports or as a single device operating where the potential maximum input to the multiplexer exceeds its output capacity.

During operation of the switching element/multiplexer there may be times at which the rate of arrival of packets will exceed the output capacity. During these periods there will be the need to store the excess incoming packets in buffers; otherwise they will be lost. There will be occasions, the frequency of which increases as the total capacity of the output link is allocated, when there will be no buffers available for allocation to the packets from the input streams. Under these circumstances packets will have to be discarded. Discarding is required both by the physical requirement that memory is finite and to ensure that the switch will recover from overload conditions (by emptying its buffers) within a finite time.

The total amount of such buffering can be allocated amongst the input streams in many ways. Each of these ways will implicitly define the loss characteristics of each of the streams. We term this operation of such a multiplexer for a given configuration of buffer capacity to input streams a behaviour of the multiplexer.

The behaviour of such a multiplexer is a system that has two degrees of freedom, because setting any two of the loss rate, throughput and delay fixes the value of the third of those parameters. For example, having decided the loss rates this constrains the operation of the multiplexer to a particular relationship between throughput and delay. For a given set of input streams the relationship is predictable.

To optimise behaviour it is, in general, necessary to first assure that the operation will fulfil the quality of service requirements of one of the parameters and then optimise with respect to the remaining degrees of freedom. This requirement needs to be met on both a stream-by-stream basis and collectively for the aggregation of all streams.

To illustrate this approach consider a mechanism in which the loss parameter is first considered. The physical instantiation is that of a shared buffer pool for all input streams, there being counters of the instantaneous occupancy of the buffers that can be consulted at the arrival time of a packet at the multiplexer. In particular, consider that there are two classes of input streams, one that contains traffic that should be preferentially cherished over other, uncherished streams. This procedure can be generalised to the case when there are more than two classes of input streams with different levels of preferential cherishing. Equation B below allows for the calculation of the number of buffers that should be reserved for the sole use of such cherished streams. This number is calculated under the assumption that the incoming uncherished traffic is unbounded and tending towards infinity. This number of buffers gives an unconditional guarantee that the loss rate of the incoming cherished traffic will be below the bounds required. It is this approach that makes the present method unconditionally stable.

Let the total number of such reserved buffers be $K_{max} - K_B$, where $K_{max}$ is the total amount of buffering available and $K_B$ is the amount to which all traffic (regardless of whether cherished or not) is admitted. The assignment of a value to this difference represents fixing one of the degrees of freedom in the system. Given this, $K_{max}$, can now be chosen to bound the total delay in the system for all the streams (as given by equation A below) such that all the delay requirements can be met given the implemented queuing discipline which distributes the delay across all the streams.

A particular example of an operational model follows:
Loss is calculated by:

$$\text{Cherished loss} = \lambda_p p_{K\,max}$$

$$\text{Uncherished loss} = \lambda_B \sum_{n=K_B}^{K_{max}} p_n$$

In order to be able to deliver traffic with a particular quality of service a prediction must be made of how much it is delayed by queuing. This is found from the waiting time distributions for each type of traffic and they can be obtained quite readily. The expected value of the waiting time distribution gives the average delay of the traffic and the standard deviation gives a measure of the variability of the delay (which may be regarded as the delay jitter). For uncherished traffic the waiting time density function is given by:

$$w_B(t) = \sum_{n=0}^{K_B-1} q_n^b \mu e^{-\mu t} \frac{(\mu t)^n}{n!}$$

where $$q_n^b = \begin{cases} \dfrac{p_n}{\left(1 - \sum_{n=K_B}^{K_{max}} p_n\right)} & \text{for } n = 0, 1, \ldots K_B - 1 \\ 0 & \text{for } n \geq K_B \end{cases}$$

(equation A). The $q_n^b$ are the probabilities that an arriving packet, that actually enters the queue finds n packets already in the system.

For cherished traffic the waiting time density function is given by:

$$\text{where } q_n^p = \begin{cases} \dfrac{p_n}{(1 - p_{K_{max}})} & \text{for } n = 0, 1, \ldots K_{max} - 1 \\ 0 & \text{for } n \geq K_{max} \end{cases}$$

For the combined uncherished traffic and cherished traffic the waiting time density function is given by $$w(t) = \sum_{n=0}^{K_{max}-1} q_n \mu e^{-\mu t} \frac{(\mu t)^n}{n!}$$

where $$q_n = \begin{cases} \dfrac{(\lambda_p + \lambda_b) p_n}{\mu(1 - p_0)} & \text{for } n = 0, 1, \ldots K_b - 1 \\ \dfrac{\lambda_p p_n}{\mu(1 - p_0)} & \text{for } n = K_b, \ldots K_{max} - 1 \\ 0 & \text{for } n \geq K_{max} \end{cases}$$

The waiting time for a given aggregate load $w_B(t)$ is given by:

$$w_B(t) = \sum_{n=0}^{K_B-1} q_n^B \mu e^{-\mu t} \frac{(\mu t)^n}{n!}$$

where $$q_n^B = \begin{cases} \dfrac{p_n}{\left(1 - \sum_{n=K_B}^{K_{max}} p_n\right)} & \text{for } n \le K_B - 1 \\ 0 & \text{for } n \ge K_B \end{cases}$$

(equation A) and the probability, Pn, that n packets are queuing for service is given by:

$$p_n = \begin{cases} \left(\dfrac{\lambda_P + \lambda_B}{\mu}\right)^n p_0 & \text{for } n = 0, 1, \dots K_B \\ \left(\dfrac{\lambda_P}{\mu}\right)^{(n-K_B)} \left(\dfrac{\lambda_P + \lambda_B}{\mu}\right)^{K_B} p_0 & \text{for } n = K_B + 1, \dots K_{max} \\ 0 & \text{for } n > K_{max} \end{cases}$$

where $\lambda_P$ is the rate of arrival of the traffic to be preferentially cherished, $\lambda_B$ is the rate of arrival of relatively un-cherished traffic, $\mu$ is the rate at which traffic is served.

$p_0$ is found from the solution of:

$$\sum_{n=0}^{K_{max}} p_n = 1$$

The existence of a quantitative relationship between these parameters allows optimisations of the switch's operational model to be performed using standard techniques.

It is important to note that the operational model allows tradeoffs to be done between loss/delay or throughput/buffers, i.e. an optimisable CAC is provided, to which standard techniques such as linear programming, neural networks, fuzzy logic etc. can be applied to achieve the optimisation. Any such optimisations can occur over different timescales and at different stages of the call-acceptance/call-teardown. This could include, but is not limited to:

| (0) | Optimising resource use for the existing set of active (or committed to) calls before receipt of a call request |
|---|---|
| (1) | Calculating and allocating resources to the call request under consideration |
| (2) | Optimising resources for the existing set of committed to calls after passing on the call request but before receipt of the call acceptance from the far end |
| (3) | Optimising resource use post acceptance of the call. |
| (4) | Optimising resources during the period of the call being active |
| (5) | Post the call tear down re-optimise the allocation of resources for the current call mix-this is equivalent to (0) |

The relationship for $w_B(t)$ given above indicates that the total amount of delay that non-discard cells will experience is dependent on the aggregate arrival rate of all the accepted connections. Where facilities exist in the switch this delay can be apportioned in different fractions to classes of streams (e.g. Weighted fair Queuing, Priority Queuing). Such models are not strictly necessary to make use of this approach as bounds on delay can be calculated for queuing disciplines such as first-in first-out.

There is flexibility in assessing the criteria for call acceptance. In general to come to a decision it is first necessary to assess the capability of system to support an individual parameter (e.g. loss rate—is there sufficient buffering resource to assure the required loss rate at the required arrival rate for this connection). This can be achieved through the application of the following equation:

$$CherishBuffers > \ln\left(\frac{P}{1 - \rho_P(1-P)}\right) \Big/ \ln \rho_P$$

(equation B) where P is the desired probability of loss and $\rho_P$ is the load of the traffic to be given preferential treatment in case of resource contention. Having made this decision and chosen a suitable value for this parameter this would define a quantifiable relationship between the remaining two parameters (e.g. delay and throughput). This decision can be made by calculating the total delay that will be present in the system after the acceptance of the call (an example of such a computation is given in the above equation for $w_B(t)$) and comparing this with the sum of allowances for delay for all the current connections The decision can then be made as to whether sufficient capacity exists to satisfy the constraint (e.g. is there sufficient un-allocated throughput to allocate to this connection to reduce the delay experienced at this node to an acceptable level). This ordering is only one possible order of considering the parameters—taking loss first and trading delay for throughput, similar approaches exist choosing one of the other parameters to be initially assessed against.

In taking into consideration a bound on the loss rate for a call we are excluding the calculations necessary to admit calls in which there is no bound on the loss (commonly called 'best-effort' traffic within the internet community). As there are no guarantees associated with such calls, such calls can always be admitted provided their effect on other calls is sufficiently benign.

The procedure to admit a call is as follows. Note that in this description "throughput" means "mean throughput". Each accepted stream has associated with it a set of parameters including throughput, loss rate and delay, which may be stored in a table held in memory as indicated by the set of options for p, set out in the example above. There is also a currently allocated throughput, an imposed total delay and an aggregate loss rate for the link. The sum of the throughputs of the streams should be less than or equal to the allocated throughput of the link, the sum of the delay bounds of the streams must be greater than or equal to the total delay applied to all streams (equivalent to the total amount of buffering allocated for the queues), and the sum of the loss rates of the streams must be greater than or equal to the aggregate loss applied to all streams. Strictly, instead of the allocated throughput of the link the sum of the product of (1-acceptable loss rate) and the required throughput should be used, but it is usual that the acceptable loss rate is so low that it is practical to use the approximation of the allocated throughput of the link.

As illustrated in FIG. 3, each switch along the route consumes a portion of the connection's acceptable delay and loss 'budget' and offers the remainder of that budget to switches further down the route. The knowledge of the relationship between throughput, delay and loss allows a balancing of resources to ensure that as many connections as are possible are accepted by the CAC; for example, a switch can meet otherwise unattainable delay requirements by allocating substantially more bandwidth than was originally requested. In fact, the relationship between throughput, loss and delay described above allows these variables to be traded off against one another in order to produce the combinations of requirements requested by a user. The QoS requirements of all current local connections, therefore, dictate the behaviour of the node's switching element in terms of both the call acceptance and the moment-by-moment operational characteristics of the switching element.

There, in principle, exists a choice as to whether to "hoard" the bandwidth or the delay—with the operational model giving the ability to predict their interaction with the collection of calls that the switch is processing. This allows for deriving a both an instantaneous cost for carrying this call (dependent on the current call configuration) and some measure of a generic cost for carrying such calls. It also allows for the assessment of differing switching configuration strategies.

What this CAC model aims to ensure, therefore, is the ability to calculate the effect of call acceptance on previously contracted node commitments, and hence the probability that acceptance will cause the switch to violate either the new or previously accepted traffic contracts.

To illustrate how the Call acceptance may be executed in practice, whilst maintaining the Quality of Service already assigned to traffic streams, we consider the following worked example.

FIG. 15 represents a small portion of a larger network, with switches A, B and C and cell streams represented by arrows.

The aim of this example is to illustrate the effect of adding a new stream between $A_0$ and $C_0$, showing how the relevant calculations would be performed, and how the acceptance of this call would affect the existing traffic through the network.

The following table describes the existing set of calls on this section of the network, and their quality requirements (as expressed in their call request packets). To simplify the calculations we have normalised the throughput of a link to be one. The delay values are then in terms of a transmission time of an ATM cell over that link. A nominal rate of 400,000 cells/sec has been used to normalise durations.

| Traffic Stream | Requested Throughput | Requested loss rate | Requested mean delay | Nominal class |
|---|---|---|---|---|
| $A_0 \rightarrow C_0$ | 0.2 | $10^{-4}$ | 0.1 ms | C, U |
| $A_1 \rightarrow D$ | 0.5 | $10^{-5}$ | 10 ms | C, ¬U |
| $A_2 \rightarrow D$ | 0.25 | | | ¬C, ¬U |
| $A_2 \rightarrow C_1$ | 0.3 | | | ¬C, ¬U |
| $B_1 \rightarrow D$ | 0.1 | | | ¬C, ¬U |
| $B_1 \rightarrow C_1$ | 0.1 | | 5 ms | ¬C, U |

The current delivered quality can be calculated from equation B:

$$K_{max} - K_B > \frac{ln\frac{P}{1 - \rho_p(1 - P)}}{ln \, \rho_p}$$

This allows calculation of the number of buffers ($K_{max}$-$K_B$) which have to be reserved at a local switch to ensure that the loss rates for cherished traffic can be achieved. This formula is for the limit of loss as the non-cherished traffic tends to infinity. Having calculated the number of buffers for the required loss rate this reduces the operational model to two degrees of freedom. Although it would be now possible to allocate by fixing the delay needed and hence overallocating throughput, fixing the throughput to that requested will be illustrated. This allows calculation of the actual loss probability for cherished and uncherished loss using the formulae given above. Knowledge of the probability of all the buffers reserved for uncherished traffic being full allows the calculation of the loss rates for such traffic streams.

Returning to FIG. 15, in this configuration network Switch A contains no urgent traffic. The use of equation B allows the bounding of the number of buffers needed to ensure acceptable loss under all circumstances. The choice of 20 represents one more than the asymptotic minimum of 19 required for a loss rate of $10^{-6}$. In switch A there are 50 allocated buffers, of which twenty have been reserved for the cherished traffic. In switch B there are only 30 allocated buffers of which 15 have been reserved for cherished traffic. In this particular circumstance the link to switch C, and hence the output links, are lightly loaded; this switch has lots of flexibility in its configuration. The effects of this switch traffic are not calculated here.

These calculations lead to the table of attributes shown in FIG. 16. The buffer configuration (N/M) should be read as N buffers retained for cherished traffic out of M. The budget and mean delay figures refer to the amount of budget retained and the actual consumption of loss or delay that the cell stream will experience during operation.

The decisions and the consequential effects of adding the connection $A_0 \rightarrow C_0$ will now be considered. To allow for the loss rates to be sustained, the decision has to be made to allocate more buffers to the cherishing of data (through use of equation B). With this configuration, previously contracted loss rates for the existing calls can be sustained as well as allowing for the admission of the current call. The switch configurations after the call has been accepted is documented in FIG. 17.

Practical applications of this technique may call for a refinement of the intermediate switches' share of a calls' loss and delay budget, once an acceptable route through the network has been found. This redistribution allows nodes to offer a large amount of resources to the call during the set-up phase (and hence minimise their consumption of the calls' loss and delay budget) without more network resources being committed to the call than is strictly necessary. This can be done utilising the Call Accept packet as it passes back through the established route.

To ensure QoS requirements the notion of a call has to exist. This is true in ATM, for IP the use of some additional management information such as RSVP performs this function. The present approach is equally applicable to both network technologies. The present model is theoretically unconditionally stable and provides guarantees even under extreme network overload (i.e. extended periods where network bandwidth and buffer resources are insufficient to meet demand). Coupled with its applications in Call Acceptance, switches designed with this model in mind may ensure that SLAs and related contracts will be honoured regardless of the state of the network. The ability to calculate loss for streams over the whole of their end-to-end route could be used to provide feedback for certain classes of traffic (for example best effort IP traffic) to attempt to limit loss late in the route.

The model presented can be scaled to offer any number of service levels and clearly differentiates between the handling of traffic of different classes. Distinct classes of traffic can be allocated different quantities of resources during transit, meaning that grades of traffic can be easily distinguished and allowing the cost of QoS classes in terms of resource utilisation to be accurately assessed. This clear separation of traffic classes and accurate connection costing in turn allows for the introduction of charging mechanisms. The model is also adaptable to describe a variety of low-level switch management algorithms.

FIG. 4 shows the state-transition diagram for a simple operational model with two levels of cell-loss priority (cherishing).

Figure 5:
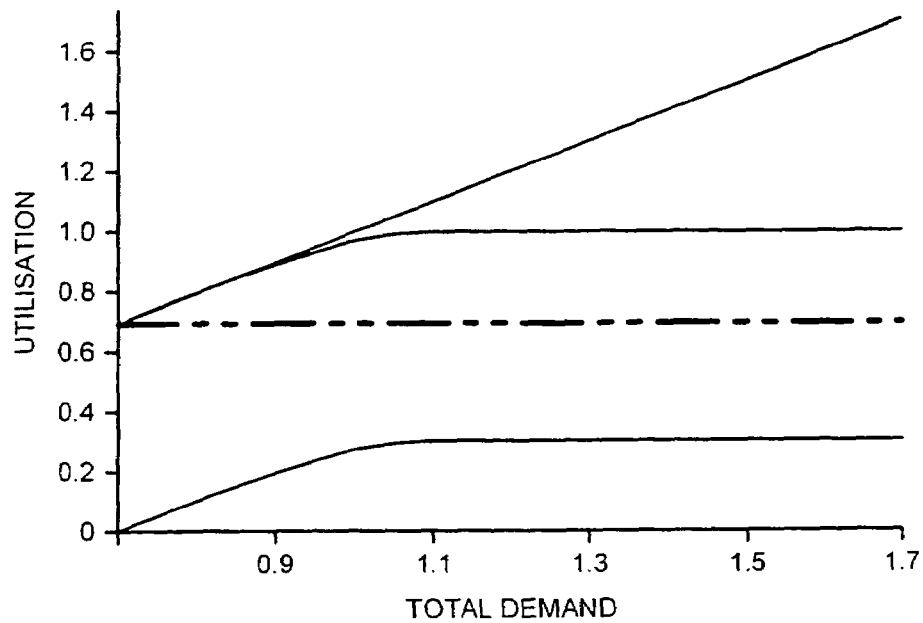
FIG. 5 shows a particular example of a switch with cherished traffic.
Figure 6:
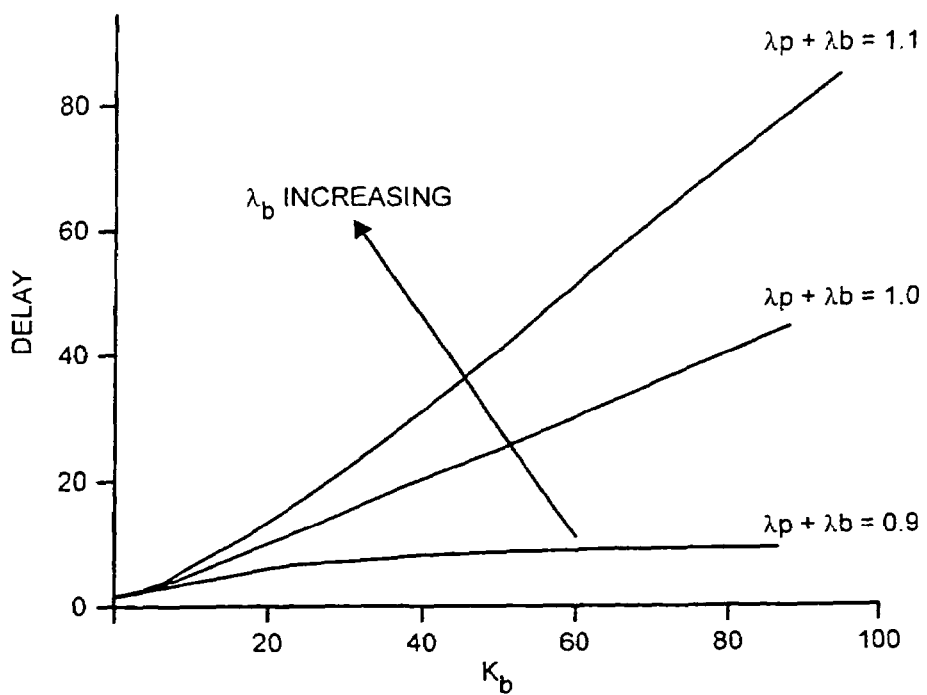
FIG. 6 shows how the average delay of all traffic increases as the number of buffers allocated to "best effort" (uncherished) traffic increases.
Figure 7:
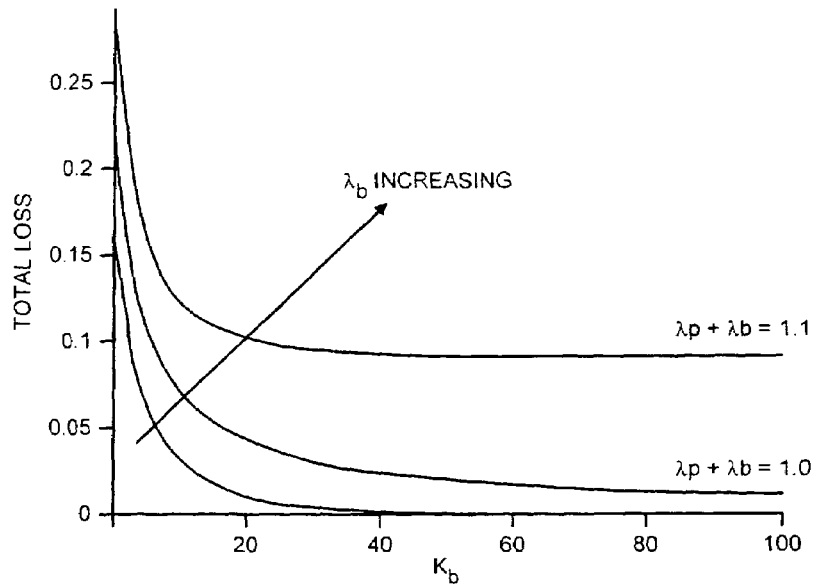
FIG. 7 shows the total loss of all traffic.

As an example, FIG. 5 shows the situation for a switch where cherished traffic arrives at a rate of 0.7 of the service rate (i.e. $\rho_P = \lambda_P/\mu = 0.7$) and where we require that less than one in a million of packets are lost (i.e. $P=10^{-6}$). In FIG. 5 the top line 50 represents the total amount of traffic arriving at the network node. The next lower line 51 represents the total amount of traffic that is serviced plotted against the demand for uncherished traffic. The lowest line 52 shows the amount of uncherished traffic that is serviced. The thick dashed line 53 represents the amount of cherished traffic that is serviced, and it should be noticed that it is almost uninfluenced by the demand for uncherished traffic. FIGS. 6 and 7 give an indication of the loss rate/throughput/delay relationship, under the same conditions as for FIG. 5. FIG. 6 shows how the average delay of all traffic increases as the number of buffers allocated to "best effort" (uncherished) traffic increases. The delay is measured in units of time where the service rate is chosen to be one. As the total demand increases above one the delay increases linearly with the number of buffers. FIG. 7 shows the total loss of all traffic. For fixed utilisation the loss decreases as the number of buffers increases. As throughput increases the total loss increases.

Figure 8:
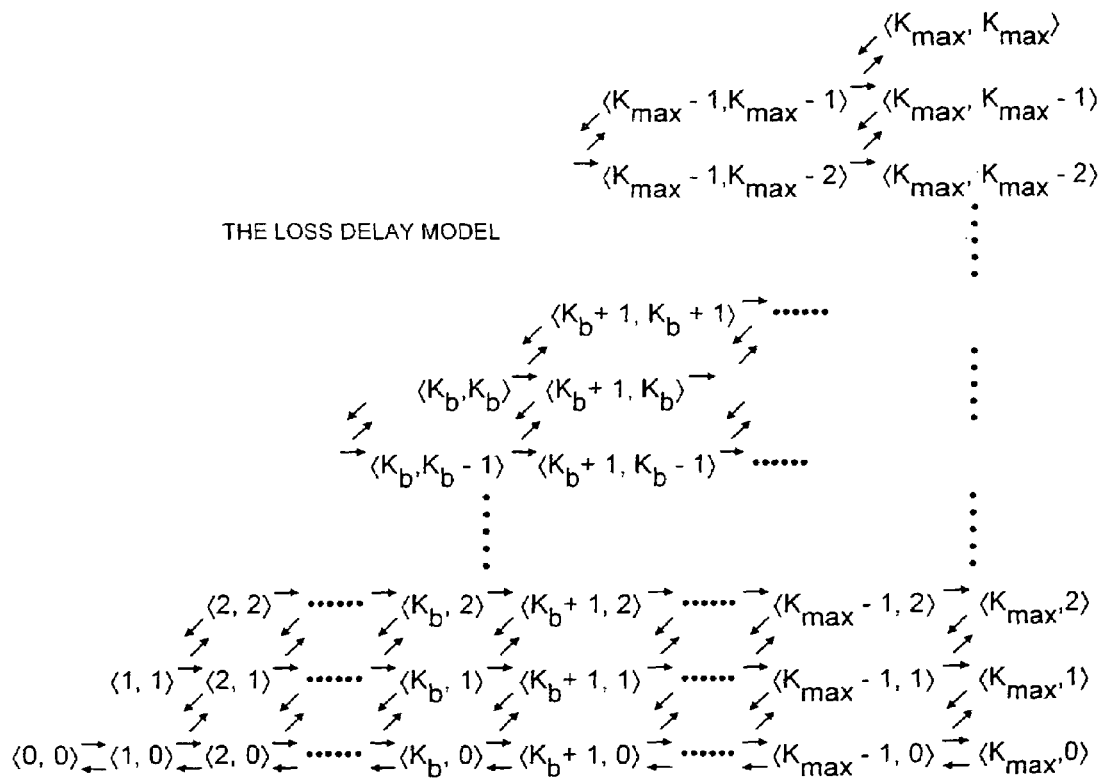
FIG. 8 shows the state-transition diagram for the second model.

FIG. 8 shows the state-transition diagram for an operational model that has been extended to allow for traffic that is urgent as well as traffic that is not urgent.

Figure 9:
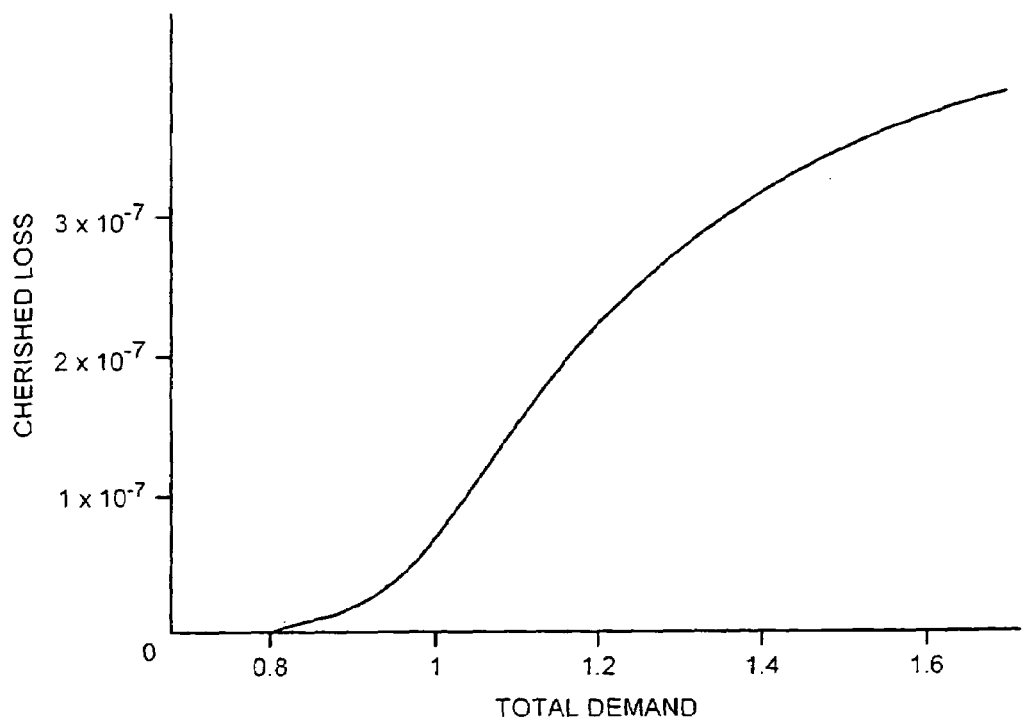
FIG. 9 shows limit on loss of cherished traffic.

FIG. 9 shows that as the amount of uncherished traffic present increases the loss of cherished traffic never increases above $10^{-6}$.

Figure 10:
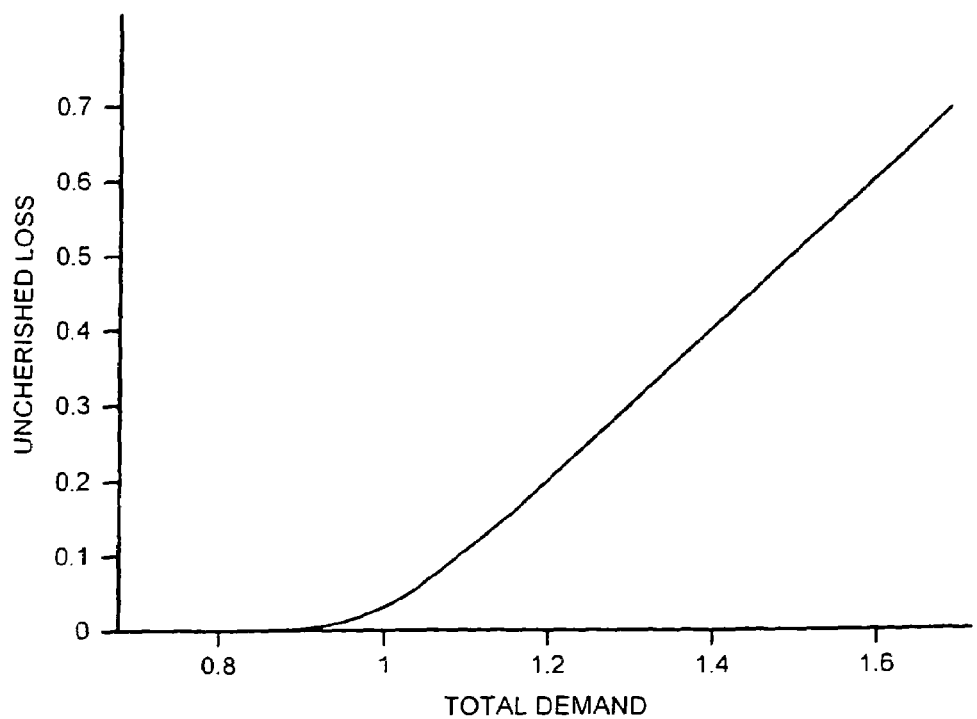
FIG. 10 shows that once the total amount of traffic increases above one the amount of uncherished traffic lost increases linearly.

FIG. 10 shows that once the total amount of traffic increases above one the amount of uncherished traffic lost increases linearly.

Figure 11:
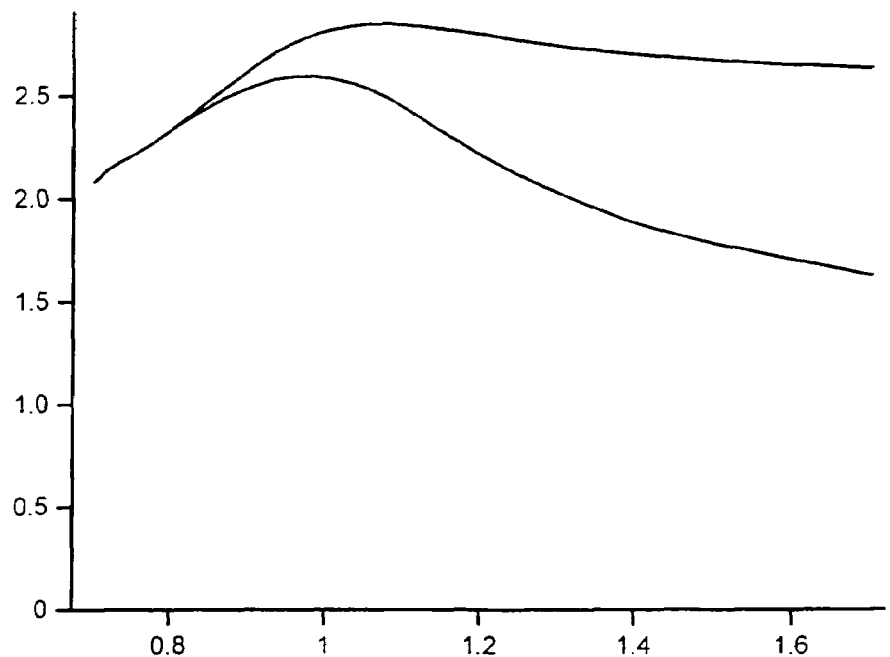
FIG. 11 shows the delay for the urgent traffic/uncherished traffic.
Figure 12:
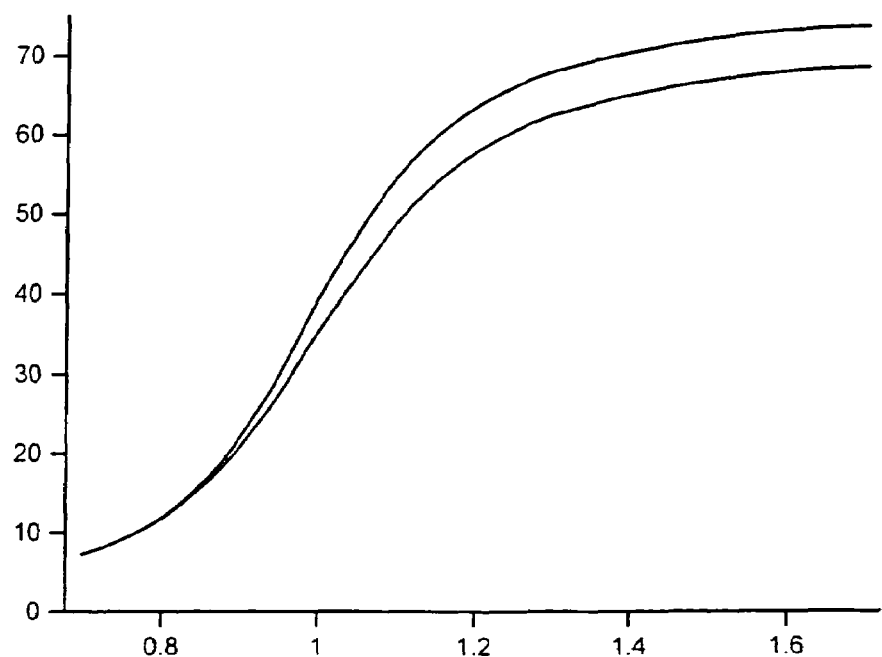
FIG. 12 shows the delay for the traffic that is not urgent.

FIG. 11 shows the delay for the urgent traffic where the upper dashed line is the delay for the cherished traffic and the lower line is the delay for the uncherished traffic. FIG. 12 shows the delay for the traffic that is not urgent.

Figure 13:
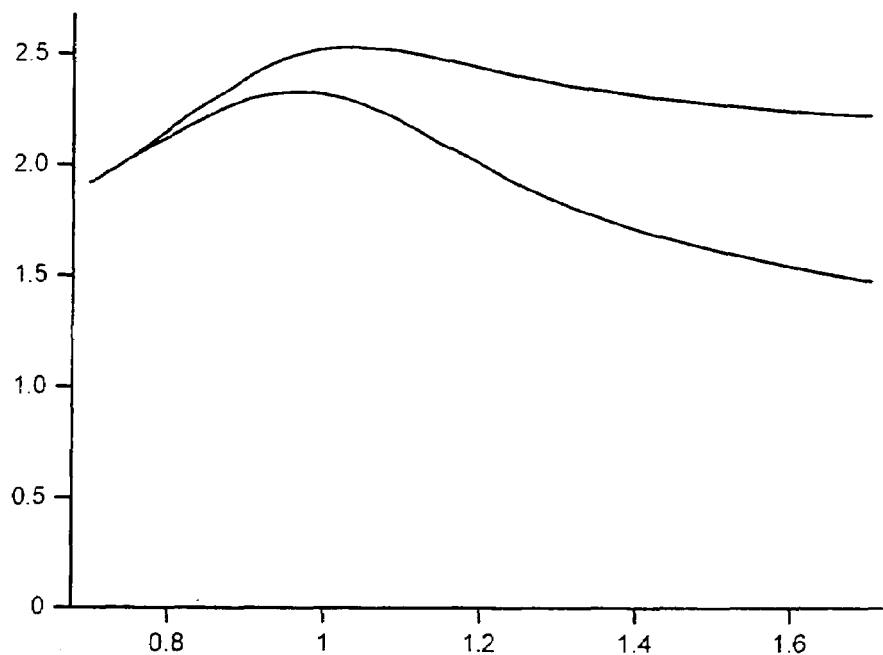
FIGS. 13 and 14 equivalent graphs for the standard deviation of the urgent and not urgent traffic.
Figure 14:
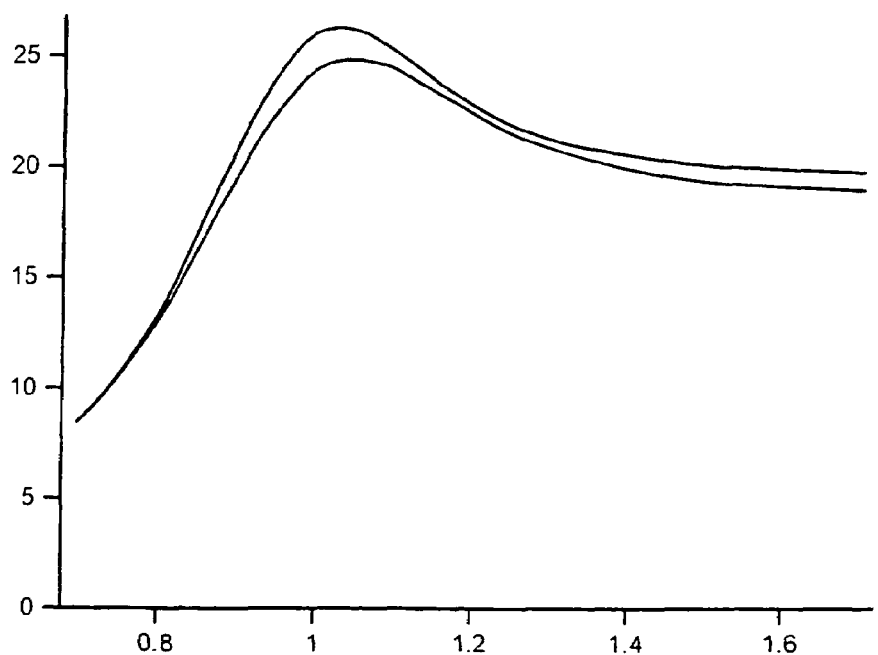

FIGS. 13 and 14 show the equivalent graphs for the standard deviation of the urgent and not urgent traffic.

In addition to or instead of providing for requested minimum delay, maximum loss rate or minimum throughput the operational model could provide for maximum permitted variations of those parameters. One especially preferred example is for the operational model to provide for maximum permitted variation in delay, corresponding to a required maximum level of jitter in packets' arrival times.

The apparatus to run the operational model could be located at a network node or at a unit elsewhere that is in communication with the node. The node could be a router, a multiplexer (or combination of two or more multiplexers), a switch or any other unit at which quality of service can usefully be considered.

A preferred embodiment of the control and configuration mechanism takes the given requirements, groups them and maps them onto the physically available resources (i.e. the finite number of cherish and urgency levels). This grouped version of the requirements is then used to derive the feasibility of the servicing the collected set of flows. From that process the parameters for the physical configuration are derived.

After some initial checks, the preferred algorithm configures first the cherishing of the composite set of streams and then the urgency. It may conveniently be assumed that:

1. The scheduling mechanism is strict priority sharing of delay.
2. Cherish mechanism is operating over a single shared buffer.
3. There is an approximation of the residual service for the delay mechanism, namely:
   Highest urgency has access to the total bandwidth of the link
   Next highest urgency has access to the total bandwidth of the link minus the actual throughput of the higher urgency levels
   This process is repeated for each decreasing urgency level with the bandwidth available for that urgency level being the total bandwidth minus the sum of all the required bandwidths of the more urgent levels.
4. All arrivals, services and residual services have a Poisson distribution.

The initial checks and the preamble of the algorithm may be performed by means of the following steps:

1. Assure that the sum of all the throughput guarantees does not exceed the capacity of the link.
2. Calculate the maximum arrival rates of all the streams, even if they are only restricted by the speed of the interface.

The cherishing of the data streams may then be configured as follows:

1. Rank the streams in increasing order of allowable loss (decreasing order of cherishing).
2. Choose a starting amount of buffering (this could just be the amount physically available).
3. Group streams with similar target loss rates together, the number of groups being limited to the number of physically available cherish levels.
4. Associate with each group the total target throughput for that collection of streams and the lowest loss rate of any stream in that collection.
5. Starting with the most cherished group calculate the required buffering to assure loss requirements. This is done under the assumption that all the less cherished streams are arriving at their maximum rates. If this can not be done, reject the configuration.
6. Repeat this process (step 5) for the decreasing cherish levels, with the assumption that the higher cherished level traffic is at (or is slightly exceeding) its contracted rate. This represents the cherish configuration for the QoS multiplexor for this collection of streams.

If the configuration requires more buffering that is physically available, reject the configuration.

The delay configuration may be performed as follows:
1. Rank the streams by decreasing urgency, i.e. increasing delay tolerance.
2. Group the streams together to fit into the finite number of urgency levels.
3. Associate with each group the total throughput of the streams in that group and the delay requirements of the most urgent stream.
4. Starting with the most urgent group, calculate the nominal bandwidth required to be available in order to satisfy the delay requirements given the total amount of bandwidth available—the nominal bandwidth may be calculated under the assumptions that this system is an M/M/1 Non-premptive Priority (HOL) Queuing System, as described in Table 18 on page 370 of Allen: Probability, Statistics and Queuing Theory (1978). This nominal bandwidth is compared with the actual available bandwidth. If it is not available then this configuration is rejected.
5. For decreasing urgency levels repeat (4) calculating the minimum excess bandwidth in on the same M/M/1/Non-premptive Priority (HOL) Queuing System assumptions and ensuring that there is sufficient residual service given that the higher urgency streams are consuming their allocated bandwidth. If there is insufficient residual bandwidth to satisfy the constraints then reject this configuration.

If step (5) can be completed for all urgency levels then the configuration is feasible. Once the above process has been completed there is sufficient information to set the parameters in the hardware to deliver the required set of contracts to the streams.

An operational model of the types described above could be used for a number of purposes, for example:
 deciding whether to accept or reject a call on the basis of whether the quality of service required for the call can be met;
 deciding whether to lose or delay a packet at a node or allot buffer space at a node in order to meet required qualities of service collectively for calls routed through that node;
 in response to a request for placement of a call providing an indication of an available quality of service, by means of which a user or unit may decide whether or not to place the call.

In a situation where a quality of service budget is to be shared between two or more nodes in a route there are several ways in which the sharing could be performed.
1. An indication of the available budget could be passed to a node. It could estimate the reduction in quality of service that it expects to impose on the call, reduce the budget by the estimated amount, and then pass that reduced budget on to the next node which performs the same process.
2. An indication of the available budget and the amount of budget used so far by preceding nodes could be passed to a node. It could estimate the reduction in quality of service that it expects to impose on the call, add the estimated amount to the amount of budget used so far, and then pass the available budget and the revised amount of budget used so far on to the next node which performs the same process.
3. An indication of the available budget could be passed to a node which also has knowledge of a maximum number (m) of nodes to be used for a call. It could then allow itself only 1/m of the available budget. Having estimated the reduction in quality of service that it expects to impose on the call the node could reject the call if it cannot use less than 1/m of the available budget. Otherwise it could pass the available budget unchanged on to the next node.

The quality of service information may be sent out of band—that is by another path than the data stream to which the QoS information relates. The QoS information may be derived from the source or the destination of the data stream, of elsewhere.

Standard optimisation techniques can be used to optimise the use of a selected operational model in given circumstances.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention. For example, the call request message might be an enquiry as to what quality of service might be supported rather than a request for a specific quality, for example as used in the RSVP protocol developed for the Internet, and call acceptance or rejection message might be a transmission of acceptable quality of service parameters.

What is claimed is:

1. A routing device for routing streams at a node in a packet transmission network,
 wherein each stream is transmitted with specified parameters for its loss and delay in the network, the routing device comprising:
 stream admission control circuitry for receiving a stream request and for reading:
 (i) said specified parameters and any values for loss and delay already incurred at preceding nodes in the network, or
 (ii) said specified parameters as modified to take account of loss and delay already incurred at preceding nodes in the network,
 to determine in conjunction with existing streams already being handled by the routing device whether to accept or reject the stream request;
 buffer circuitry including a plurality of buffers, wherein one or more of said buffers are allotted to said stream if the stream request has been accepted; and
 means for transmitting:
 (i) the stream request with modified values for loss and delay, or
 (ii) the stream request with modified parameters to take account of loss and delay incurred at this and preceding nodes in the network,
 if the stream request has been accepted, and for returning a fail signal if the stream request has been rejected.

2. A routing device as claimed in claim 1, comprising means for detecting a stream fail signal from another node in the network and for releasing the buffers which it had allocated for that stream.

3. A routing device as claimed in claim 1, comprising decision making means for determining on whether to accept or reject the stream request.

4. A routing device as claimed in claim 1, wherein the buffer circuitry allots the buffers according to the model:

$$K_{max} - K_B > \frac{ln\frac{P}{1-\rho_\rho(1-P)}}{ln\,\rho_\rho}$$

where $K_{max}$ is the total amount of buffering available, $K_B$ is the amount to which traffic is admitted, P is a desired probability of loss and $\rho_\rho$ is a load to traffic to be given preferential treatment in the case of resource contention.

5. A routing device as claimed in claim 1, wherein the said loss is a measure of acceptable loss for the respective stream and the said delay is a measure of acceptable delay for the respective stream.

6. A routing device as claimed in claim 1, wherein the buffer circuitry is arranged to allot the buffers by ranking the streams in order of loss, selecting a starting amount of buffering, grouping together streams with similar loss, determining for each group a total target throughput for that group of streams and the lowest loss rate of any stream in that group, and calculating for each group the required buffering to assure loss requirements, and if a total required buffering exceeds an available buffering rejecting the configuration of grouped streams.

7. A routing device as claimed in claim 1, wherein the buffer circuitry is arranged to allot the buffers by ranking the streams by increasing delay tolerance, grouping together streams with similar delay tolerance, determining for each group a total throughput for that group of streams and the delay tolerance of the most urgent stream in that group, and calculating for each group a nominal bandwidth required to be available in order to satisfy the delay requirements, and if a total required bandwidth exceeds an available bandwidth rejecting the configuration of grouped streams.

8. A routing device as claimed in claim 6, wherein the number of groups is limited to a predetermined number.

9. A routing device for routing streams at a node in a packet transmission network,
wherein each stream is transmitted with specified parameters for its acceptable delay and probability of loss during transmission in the network, the routing device comprising:
stream admission control circuitry for;
(i) receiving a stream request comprising parameters for quality of service,
(ii) modeling the quality of service for the stream if it were routed through this node,
(iii) generating adjusted parameters for quality of service by adjusting the received parameters for quality of service to take account of reduction in quality of service if the stream were routed through this node,
(iv) if the adjusted parameters are indicative of unacceptable quality of service rejecting the stream request, and
(v) if the adjusted parameters are indicative of acceptable quality of service transmitting the adjusted parameters to another node in the network.

10. A routing device as claimed in claim 9, wherein the said parameters for quality of service preferably include at least two of:
minimum delay, maximum loss rate and minimum throughput, and/or levels of variation of delay, loss rate or throughput.

11. A method for routing streams at a node in a packet transmission network, wherein each stream is transmitted with specified parameters for its loss and delay in the network, the method comprising:
receiving a stream request;
reading:
(i) said specified parameters and any values for loss and delay already incurred at preceding nodes in the network, or
(ii) said specified parameters as modified to take account of loss and delay already incurred at preceding nodes in the network,
to thereby determine in conjunction with existing streams already being handled by a routing device whether to accept or reject the stream request;
allocating memory buffer resources to said stream if the stream request is accepted; and
transmitting:
(i) the stream request with modified values for loss and delay, or
(ii) the stream request with modified parameters to take account of loss and delay incurred at this and preceding nodes in the network,
if the stream request is accepted, and for returning a fail signal if the stream request has been rejected.

12. A method as claimed in claim 11, comprising detecting a stream fail signal from another node in the network and for releasing the buffers which it had allocated for that stream.

13. A method as claimed in claim 11, wherein the step of allocating memory buffer resources allots buffers according to the model:

$$K_{max} - K_B > \frac{ln\frac{P}{1-\rho_\rho(1-P)}}{ln\,\rho_\rho}$$

where $K_{max}$ is the total amount of buffering available, $K_B$ is the amount to which traffic is admitted, P is a desired probability of loss and $\rho_\rho$ is a load to traffic to be given preferential treatment in the case of resource contention.

14. A method as claimed in claim 11, wherein the said loss is a measure of acceptable loss for the respective stream and the said delay is a measure of acceptable delay for the respective stream.

15. A method as claimed in claim 11, wherein the step of allocating memory buffer resources is arranged to allot the buffers by ranking the streams in order of loss, selecting a starting amount of buffering, grouping together streams with similar loss, determining for each group a total target throughput for that group of streams and the lowest loss rate of any stream in that group, and calculating for each group the required buffering to assure loss requirements, and if a total required buffering exceeds an available buffering rejecting the configuration of grouped streams.

16. A method as claimed in claim 11, wherein the step of allocating memory buffer resources is arranged to allot the buffers by ranking the streams by increasing delay tolerance, grouping together streams with similar delay tolerance, determining for each group a total throughput for that group of streams and the delay tolerance of the most urgent stream in that group, and calculating for each group a nominal bandwidth required to be available in order to satisfy the delay requirements, and if a total required bandwidth exceeds the available bandwidth rejecting the configuration of grouped streams.

17. A method as claimed in claim 15, wherein the number of groups is limited to a predetermined number.

18. A method for routing streams at a node in a packet transmission network,
   wherein each stream is transmitted with specified parameters for its acceptable delay and probability of loss during transmission in the network, the method comprising:
   (i) receiving a stream request comprising parameters for quality of service,
   (ii) modeling the quality of service for the stream if it were routed through this node,
   (iii) generating adjusted parameters for quality of service by adjusting the received parameters for quality of service to take account of reduction in quality of service if the stream were routed through this node,
   (iv) rejecting the stream request if the adjusted parameters are indicative of unacceptable quality of service, and
   (v) transmitting the adjusted parameters to another node in the network if the adjusted parameters are indicative of acceptable quality of service.

19. A method as claimed in claim 18, wherein the said parameters for quality of service preferably include at least two of:
   minimum delay, maximum loss rate and minimum throughput, and/or levels of variation of delay, loss rate or throughput.

* * * * *